United States Patent
Krebs

(10) Patent No.: US 8,657,102 B2
(45) Date of Patent: Feb. 25, 2014

(54) CONVEYOR APPARATUS

(75) Inventor: Niels Krebs, Hellerup (DK)

(73) Assignee: Force Technology, Brondby (DK)

( * ) Notice: Subject to any disclaimer, the term of this patent is extended or adjusted under 35 U.S.C. 154(b) by 72 days.

(21) Appl. No.: 13/390,685

(22) PCT Filed: Aug. 10, 2010

(86) PCT No.: PCT/EP2010/061619
§ 371 (c)(1),
(2), (4) Date: Apr. 25, 2012

(87) PCT Pub. No.: WO2011/020745
PCT Pub. Date: Feb. 24, 2011

(65) Prior Publication Data
US 2012/0205220 A1    Aug. 16, 2012

(30) Foreign Application Priority Data

Aug. 17, 2009 (DK) .................................. 2009 70091

(51) Int. Cl.
*B65G 17/16* (2006.01)
(52) U.S. Cl.
USPC ..... 198/680; 198/802; 198/475.1; 198/465.4; 452/177; 452/187; 452/188
(58) Field of Classification Search
USPC ........... 198/465.4, 680, 685, 686, 475.1, 802; 452/177–180, 184, 187, 188
See application file for complete search history.

(56) References Cited

U.S. PATENT DOCUMENTS

| 1,500,776 | A |   | 7/1924  | Spooner |
| 3,124,831 | A |   | 3/1964  | Altenpohl |
| 3,132,373 | A | * | 5/1964  | Altenpohl, Jr. ................ 452/183 |
| 3,708,829 | A |   | 1/1973  | Klevgard |
| 4,660,256 | A |   | 4/1987  | Innes et al. |
| 5,026,317 | A |   | 6/1991  | Kennedy |
| 7,464,806 | B2 | * | 12/2008 | Borkiewicz et al. ........ 198/465.4 |
| 7,572,176 | B2 | * | 8/2009  | Petersen et al. ................ 452/184 |

FOREIGN PATENT DOCUMENTS

| DE | 4025821 A1 | 2/1992 |
| EP | 0086700 A1 | 8/1983 |
| WO | 98/56255 A1 | 12/1998 |

OTHER PUBLICATIONS

International Search Report and Written Opinion received for PCT Patent Application No. PCT/EP2010/061619, mailed on Oct. 12, 2010, 10 pages.

* cited by examiner

*Primary Examiner* — Leslie A Nicholson, III
(74) *Attorney, Agent, or Firm* — Morrison & Foerster LLP

(57) ABSTRACT

A conveyor apparatus for conveying objects (6) along a path, the path including an upstream portion (17) and a curved portion (13), the upstream portion (17) defining a direction of entry into the curved portion (13), the curved portion (13) defining a radially outward direction transverse to the direction of entry into the curved portion; the conveyor apparatus comprising suspension means (4) adapted to travel along the path and to carry an object (6) to be conveyed suspended at the suspension means (4); and deflection means (10) arranged to deflect an object (6) suspended at the suspension means (4) in the radially outward direction when the suspension means (4) travels along the upstream portion (17) towards the curved portion (13).

12 Claims, 10 Drawing Sheets

CONVEYOR APPARATUS

CROSS REFERENCE TO RELATED APPLICATIONS

This is a U.S. National Phase patent application of PCT/EP2010/061619, filed Aug. 10, 2010, which claims priority to Danish Patent Application No. 2009 70091, filed Aug. 17, 2009, each of which is hereby incorporated by reference in the present disclosure in its entirety.

TECHNICAL FIELD

This invention relates to conveyor apparatus of the type where objects to be transported are suspended from a carrier member or other conveying means that travels along a path of conveyance.

BACKGROUND

Overhead conveyor apparatus such as high-speed conveyor rail transportation systems, for transportation of articles, goods, components, etc. are in routine use in many sectors, including food industry. For instance, such systems are used at meat and poultry slaughter-houses and packing plants for transportation of carcasses.

In overhead conveyor apparatus, objects are usually suspended from a carriage or other conveying means at a suspension point, e.g. as defined by a hook or other means for carrying the object. For example, goods (e.g. carcasses) may be suspended on carriages of a conveyer rail. Such a suspended object may thus be regarded as a compound pendulum whose suspension point moves along the conveyer path, e.g. as defined by a conveyor rail.

Usually, no complications arise while the motion of the suspended objects remains uniform and rectilinear. However, inertia forces arise and cause the pendulums to swing in connection with curves/turns of the conveyer path. The resulting oscillations induced by the turn of the conveyer path can be especially amplified during a high speed motion and occur in a plane that is transverse to the direction of motion and can therefore be the cause of a break or a failure, e.g. due to derailing of the carriage, objects being disconnected from the carriage, causing them to fall and/or block the conveyor, etc.

Furthermore, in connection with processing machines that operate on the conveyed objects, the oscillations may cause improper alignment with devices or machines that are to operate on the objects. For example, in the context of poultry processing machines such as an eviscerator, bird washer, etc., the carcasses are typically suspended by their legs from an overhead conveying system. It is often difficult to accurately position and maintain the carcasses in proper alignment with the processing elements such as cutting knives, water nozzles, camera, etc. resulting in imprecise treatment and an inconsistent product. Thus, there is a need for reducing the swinging, turning and revolving of the conveyed objects in an overhead conveyor apparatus.

SUMMARY

Disclosed herein is a conveyor apparatus for conveying objects along a path, the path including a curved portion and an upstream portion upstream of the curved portion, the upstream portion defining a direction of entry into the curved portion, the curved portion defining a radially outward direction transverse to the direction of entry into the curved portion; the conveyor apparatus comprising:

suspension means adapted to travel along the path and to carry an object to be conveyed suspended at the suspension means;

deflecting means arranged to deflect an object suspended at the suspension means in the radially outward direction when the suspension means travels along the upstream portion towards the curved portion.

Hence, in embodiments of the conveyor apparatus described herein, the pendulum formed by the suspended object is deflected from a vertical axis defined by the suspension point, right before the conveyer path turns, while the suspension point follows the conveyer path. Thus the pendulum continues its rectilinear motion even though the suspension point already enters the turn. The deflection may be caused by a guiding bar or beam. It will be appreciated that the pendulum may instantly change the direction of motion when the guiding bar ends. However, the guiding bar reduces transverse oscillations of the pendulum during the curved portion and after exiting the curved portion.

In some embodiments, the deflection means includes an elongated guide member such as a guiding beam, bar, rail, track or the like. The elongated guide member may be provided at an angle to the rail and separated from the trajectory of suspension points.

It will be understood that the suppression of undesired oscillations in connection with curved portions as described herein applies to situations where the upstream portion is straight or at least curved to a lesser degree than the curved portion. In some embodiments, the upstream portions and the curved portion define a point of transition—also referred to as turning point or transition point—between the upstream portion and the curved portion where the upstream portion ends and the curved portion starts, i.e. where the curvature of the path changes, e.g. where the curvature of the path increases, where an orientation of curvature changes, or the like. In particular, at this turning point the upstream portion may be tangential to the curved portion. It will be appreciated that the curved portion may include a sequence of portions having different curvature, e.g. two curved portions separated by a straight portion. The deflection means may thus be adapted to cause the object suspended at the suspension means at the transition point to be deflected by a predetermined magnitude in the radially outward direction.

The magnitude of the deflection provided by the deflection means, e.g. the guide member, relative to the trajectory of the suspension points may be chosen such that the magnitude of deflection of the object at the transition point corresponds or is even equal to a steady state deflection of the object when suspended at a suspension point travelling along a circular path having a radius corresponding e.g. equal to the radius of curvature of the curved portion at the transition point, and at a speed equal to the speed at which the suspension means travels along the path. Hence, the deflection means may cause the suspended objects to be transversally deflected from the vertical when they enter the curved portion at the point of transition. When continuing through the curved portions, the suspended objects thus generally continue at the initial deflection without oscillating around the vertical line, or at least with a considerably reduced oscillation.

In some embodiments, the elongated guide member may extend from a position upstream of the turning point to at least the transition point. In some embodiments, the elongated guide member may extend downstream beyond the turning point thus defining an overrun portion of the elongated guide member downstream from the turning point. This overrun portion may be curved corresponding to the curvature of the curved portion of the path, i.e. the overrun portion may follow the curved portion of the path, e.g. at a constant horizontal distance. In alternative embodiments the horizontal distance may change along the curved portion.

It will be appreciated that the horizontal deflection provided by the deflection means, e.g. the guide member, relative to the trajectory of the suspension points may be chosen responsive to the speed of the motion of the suspension point along the conveyor path, i.e. the speed of conveyance, and the radius of curvature of the curved portion. In some embodiments the horizontal-plane deflection of the elongated guide member from the trajectory of the suspension points is adjustable responsive to the speed of the motion of the suspension point along the conveyor path, i.e. the speed of conveyance, i.e. for a given curved path, the horizontal deflection may be changed as a function of the speed of conveyance. In some embodiments, the length of the elongated guide member overrun after the turning point is also adjustable responsive to the speed of conveyance.

The deflecting means may be adapted to perform a deflecting action on the suspended object at a deflection point at a predetermined vertical distance from the suspension point. For example, the deflection means may impart a deflecting force on the suspended object, in particular a deflecting force in a transverse direction that corresponds to the radially outward direction at the turning point. The deflection point may be located at any suitable height relative to the suspension point and the object to be conveyed. In some situations, it may be desirable to position the deflection point at a certain distance from the object so as to avoid any possible contact of the object with the guide member. For example, this may be desirable in order to avoid contamination of the object, e.g. by bacteria. It will further be appreciated that an increased distance of the deflection point from the suspension point increases the robustness of the conveyor apparatus against small misalignments of the deflection point, in particular, if the suspension means comprises a carrier device that is not stiff.

The suspension means may be any device or arrangement suitable for conveying a suspended object along a predetermined path. In particular, the suspension means may define a suspension point at which an object may be suspended while the suspension point travels along the predetermined path. For example, the suspension means may comprise a movable carriage member adapted to move along an elongated guide member such as a track, a rail, etc. Alternatively or additionally, the suspension means may comprise a belt, chain or other continuous conveyor means. Such a continuous conveyor means may be movably arranged in a loop having a conveyance portion where the moveable continuous conveyor member defines a forward direction of conveyance, and a return portion.

The suspension means may comprise a suitable carrier element such as a shackle, a hook, etc. The suspension means may further comprise a bar, a beam, a hanger, or other carrier device for attaching the object to be conveyed, for example a carrier device having one end connectable to the object and another end connectable to the suspension point.

The curved portion may be a substantially circular portion e.g. defined by the circumference of a rotatable wheel, a carousel, or the like. Alternatively, the curved portion may be defined by a curved portion of a track, a rail or the like. The radius of curvature may be constant or vary along the curved portion.

The present invention relates to different aspects including the apparatus described above and in the following, a corresponding method and corresponding uses, each yielding one or more of the benefits and advantages described in connection with the above-mentioned apparatus, and each having one or more embodiments corresponding to the embodiments described in connection with the above-mentioned apparatus and or as disclosed in the dependent claims.

BRIEF DESCRIPTION OF THE DRAWINGS

The above and other aspects will be apparent and elucidated from the embodiments described in the following with reference to the drawing in which.

DETAILED DESCRIPTION

Figure 1:
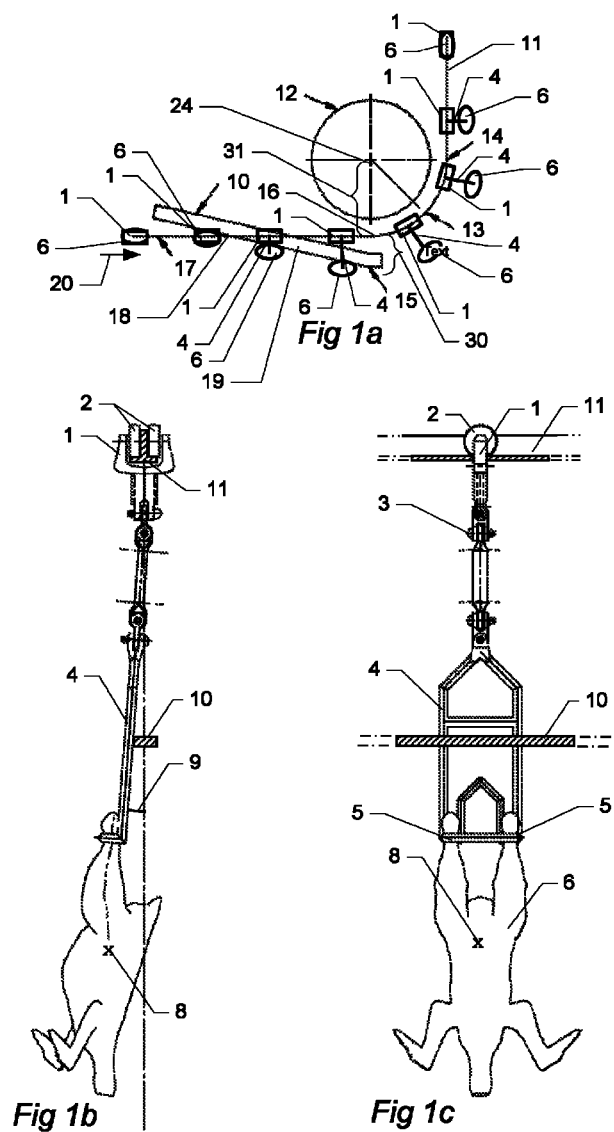
FIG. 1 shows an embodiment of a conveyor apparatus.

FIG. 1 shows an embodiment of a conveyor apparatus. In particular, FIG. 1a shows a top view of a part of a conveyor apparatus, while FIGS. 1b and c show a side view of a carriage with an object 6 suspended at it. In the example of FIG. 1, the object 6 is a poultry carcass, but it will be appreciated that the apparatus described herein may be used to convey different objects as well. The conveyor apparatus comprises a rail 11 along which a plurality of carriages 1 are conveyed. For example, the rail 11 may be a T-shaped rail as illustrated in FIG. 1b, and the carriages 1 may include a pair of wheels 2 abutting and rolling on the rail. The carriages 1 may be connected to a chain, belt or other drive means (not explicitly shown) arranged along the rail 11 and for driving the carriages along the rail 11. The carriages 1 comprise a carrier element 4, e.g. a hanger, bar, beam etc., attached to the carriage at a suspension point 3, e.g. a hook, shackle, shaft, pin, etc. Hence, the rail 11 defines a trajectory or path along which the suspension point 3 is adapted to travel. The direction of the movement of the carriages 1 along the rail 11 is indicated by arrow 20.

The carrier element 4 may be suspended at the suspension point 3 such that it is allowed to pivot around the suspension point in a plane parallel with the rail 11 and/or in a plane transversal to the rail 11. An object 6 to be conveyed is removably attached to each of the carrier elements 4 at one or more attachment points 5, e.g. a cross bar, a loop, a hook, and/or the like. In the example, of FIG. 1, the object 6 is a poultry carcass suspended at its legs.

It will be appreciated that in alternative embodiments the conveyor apparatus may include a different type of rail and/or a different type of carriage and/or a different type of drive means and/or a different type of carrier element. Generally, the conveyor apparatus allows the objects 6 to be suspended at a suspension point 3 which is driven to travel along a path 11 of conveyance.

The rail 11 includes a curved portion 13 and a straight upstream portion 17 upstream from the curved portion 13. In the example of FIG. 1, the curved portion 13 is a circular portion where the carriages are driven around a circular arc 13 by a turning wheel 12 rotating around the centre 24 of the circular arc 13. At the transition point 16, the straight upstream portion 17 ends and the curved portion 13 begins. In the example of FIG. 1, the straight portion 17 is tangential to the circular arc 13 in the transition point 16.

When the suspended objects 6 travel along the straight upstream portion 17, the objects 6 generally hang in a vertical longitudinal plane defined by the path of the suspension points, and in particular by the vertical lines 7 through the suspension points 3, i.e. the centre of mass 8 of the compound object including the carrier element 4 and the suspended object 6 substantially moves in a vertical longitudinal plane defined by the vertical lines 7 through the suspension points 3. It will appreciated that the suspended object may perform some oscillations within this longitudinal vertical plane, e.g. due to acceleration or deceleration of the carriages along the rail. It will further be appreciated that the object may perform small oscillations in a direction transverse to the longitudinal vertical plane. While small transversal oscillations may be unavoidable and acceptable, such oscillations may increase in connection with curved portions of the path due to the inertial forces acting on the suspended objects.

Such oscillations may be reduced by deflecting the suspended object 6 immediately prior to entering the curved portion, i.e. immediately upstream of transition point 16.

To this end, the conveyor apparatus comprises a guide bar 10 that is arranged generally in the direction of the straight portion 17, but forming an angle with the rail 11. The guide bar 10 is vertically displaced relative to the rail such that it crosses the path of the lower portion of the carrier element 4 at a predetermined angle so as to force the lower portion of the carrier element 4—and thus the suspended object 6 attached to the carrier element 4—away from the vertical line 7 in a radially outward direction relative to the curved portion, i.e. away from the centre 24. Hence, when the suspended object passes the point 18 where the guiding bar intersects the trajectory of the object 6, the object 6 is gradually forced radially outwards until it reaches a desired deflection at the transition point 16.

The length of the guide bar 10 and its angle relative to the rail 11 are chosen such that the magnitude 30 of deflection of the object 6 at the transition point 16 corresponds to a steady state deflection of the object 6 when suspended at a suspension point 3 travelling along a circular path having a radius corresponding to the radius 31 of curvature of the curved portion at the transition point 16, and at a speed corresponding to the speed at which the carriages 1 travel along the rail 11. Hence, the bar 10 causes the suspended objects to be transversally deflected from the vertical when they enter the curved portion at point 16, e.g. as illustrated in FIG. 1b where the suspended object is shown transversely deflected from the vertical 7 by an angle 9. When continuing through the curved portions 13 beyond the guide 10, the suspended objects thus generally continue at the initial deflection without oscillating around the vertical line, or at least with a considerably reduced oscillation.

In the example of FIG. 1, the guide bar has a straight portion 19 at an angle relative to the straight rail portion 17. At one end of the guide 10 the guide has a curved end portion 15 following the curvature of the curved portion of the rail 11, thus providing a short overrun portion beyond the transition point 16 and substantially in a tangential direction to the curved portion 13 at the transition point 16.

Figure 2:
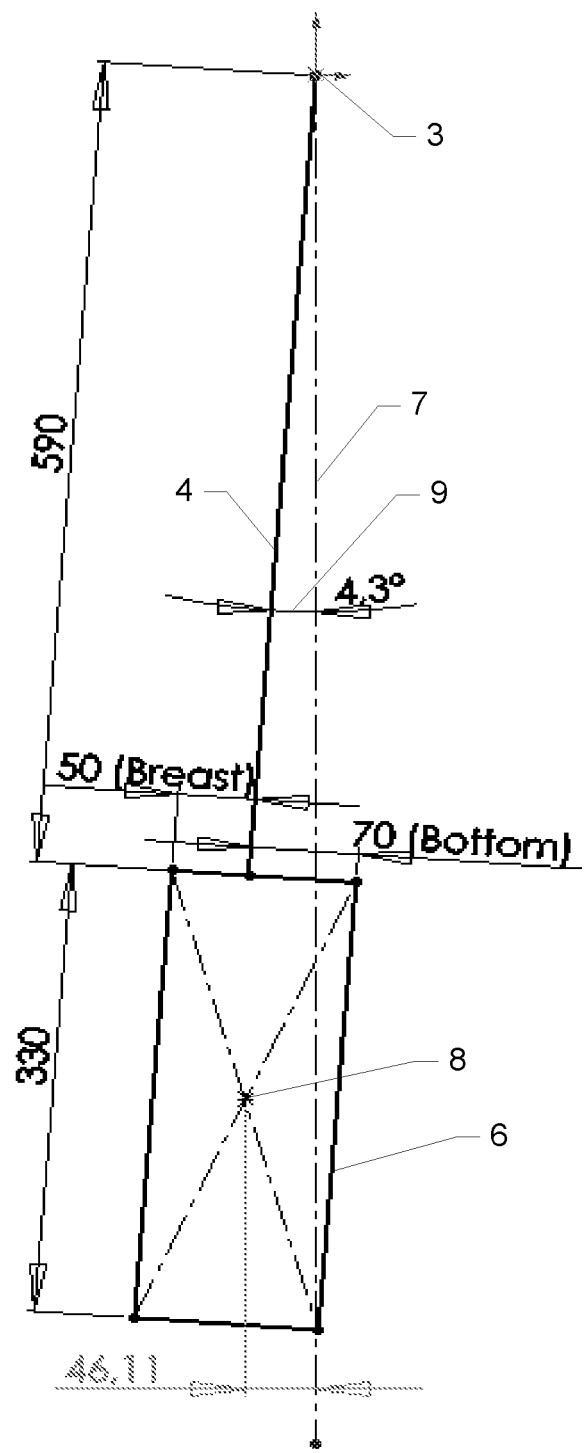
FIG. 2 shows a schematic view of a suspended object.

FIG. 2 shows a schematic view of a suspended object. In particular, FIG. 2 schematically illustrates the compound object comprising the carrier element 4 and the object 6 connected to it. The compound object is suspended at the suspension point 3, and the centre of mass 8 of the compound object 8 is shown deflected from the vertical 7 at an angle 9.

Figure 3:
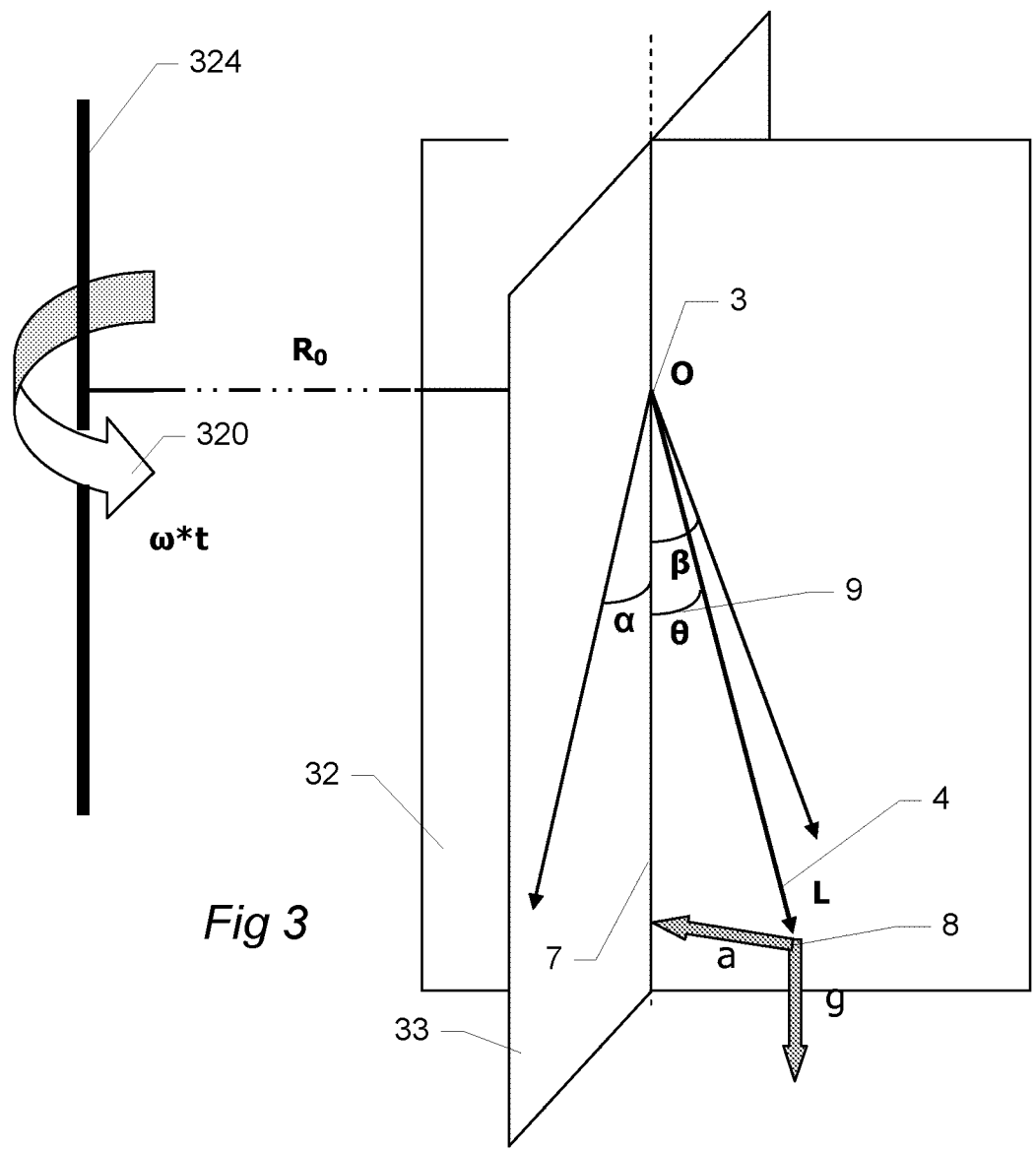
FIG. 3 illustrates a coordinate system for describing the deflection of a suspended object in a curved portion of the path of conveyance.

FIG. 3 illustrates a coordinate system for describing the deflection of a suspended object in a curved portion of the path of conveyance. In particular, FIG. 3 shows the axis 324 of rotation, e.g. the axis of rotation of the turning wheel 12 of FIG. 1. The orientation of rotation is illustrated by arrow 320. The angular velocity is denoted ω, i.e. the angular rotation during time t is ωt. The suspension point 3 is located at a radius $R_0$ from the centre 324 of rotation. For the purpose of the present description, the suspension point 3 is taken as origin of a rotating coordinate system with coordinate axis in the direction of the radius, tangentially to the circular motion in the suspension point, and vertically downward, respectively. The angle θ denotes the angular deflection of the suspended object, while angle α denotes the deflection in the tangential vertical plane 33, and the angle β denotes the deflection in the radial vertical plane 32. The gravitational acceleration g and the centripetal acceleration a are shown originating from the centre of mass 8 of the compound object comprising the carrier element 4 and the suspended object.

The steady-state deflection θ may thus be determined as $$\theta = a\tan\left(\frac{v^2}{R_0 g}\right),$$

(it may be noted that θ=β for the steady-state deflection) where v=ω$R_0$ denotes the speed of conveyance of the suspension point along the circular path. Hence, in one embodiment, the guide bar is arranged such that it causes a deflection by the thus determined angle θ.

Figure 4:
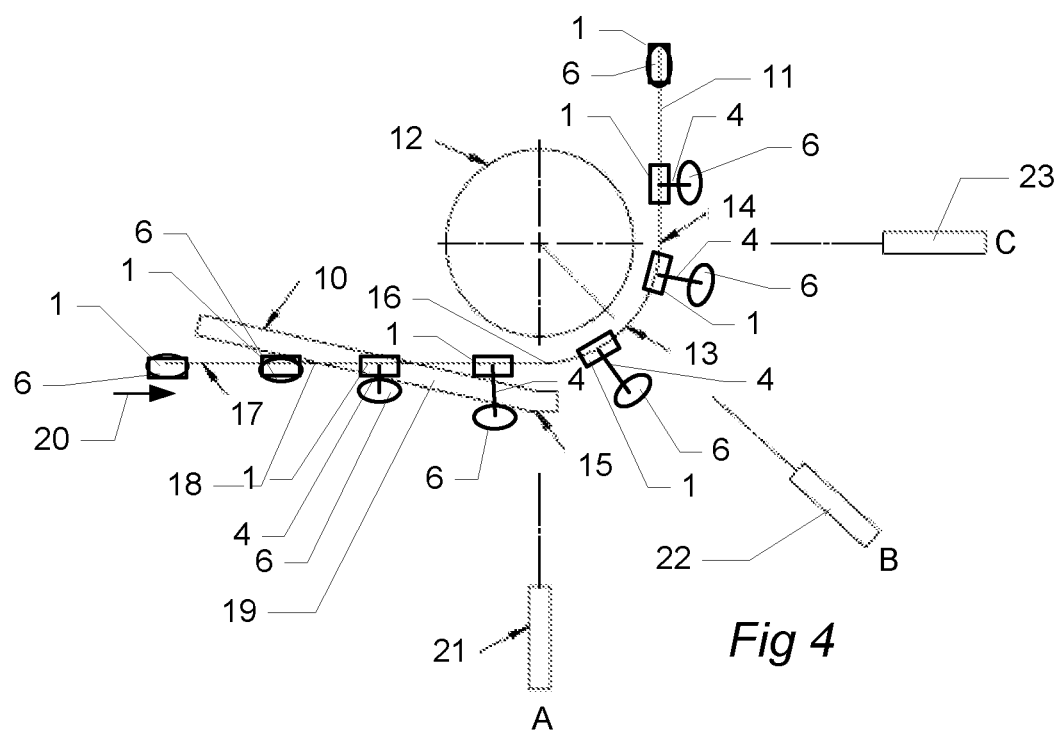
FIG. 4 shows an arrangement for measuring deflection of objects during in a curve portion of an embodiment of a conveyor apparatus.

FIG. 4 shows an arrangement for measuring deflection of objects during movement through a curved portion of an embodiment of a conveyor apparatus. In particular, FIG. 4 shows the conveyor apparatus described in connection with FIG. 1 but with the addition of 3 laser-based measurement devices 21-23 for measuring the deflection of the suspended objects from the vertical at three positions during the curved portion 13, namely at the entry 16 to the curved portion (designated position A), at approximately the middle of the curved portion (designated position B) and at the exit of the curved portion (designated position C) where the rail returns to a straight downstream path.

Figure 5:
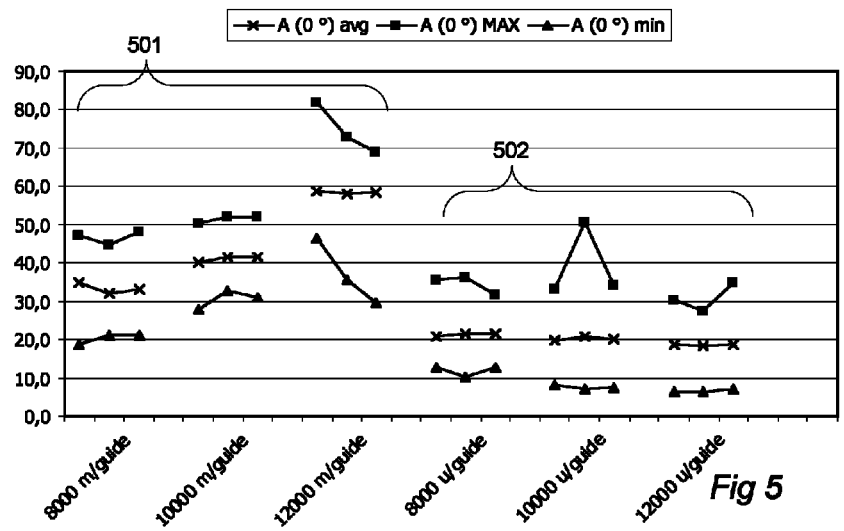
FIGS. 5-7 show measured deflections in the arrangement of FIG. 4.
Figure 6:
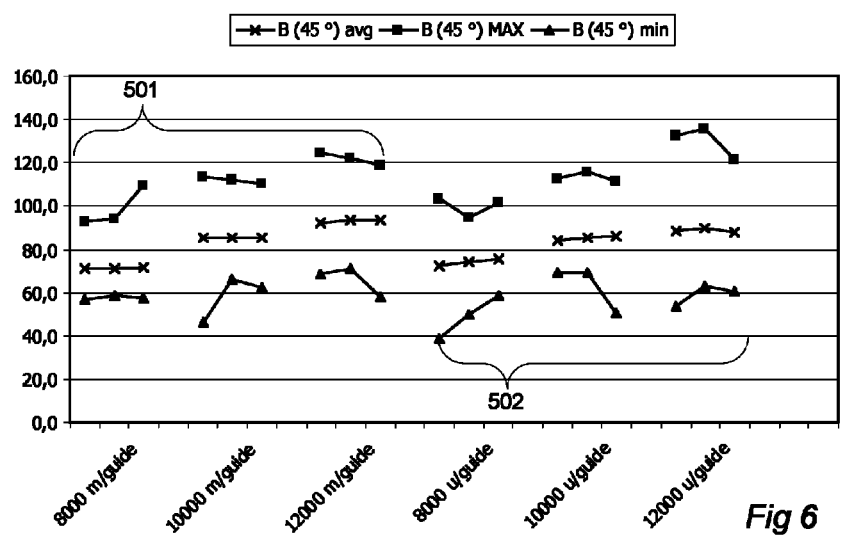
Figure 7:
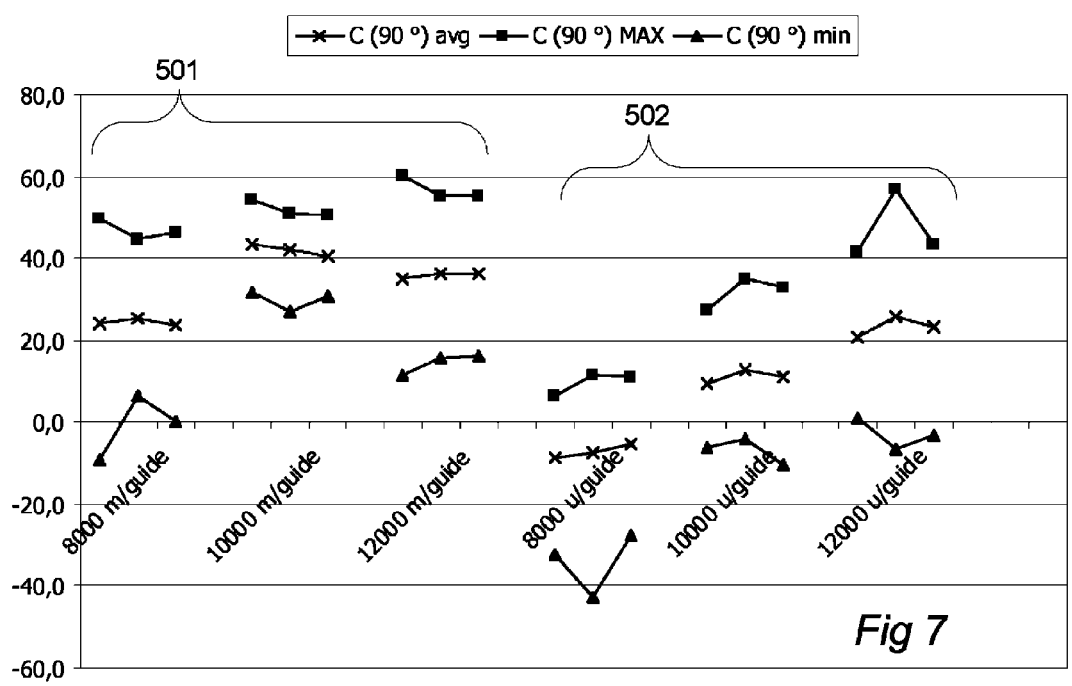

FIGS. 5-7 show measured radial deflections in the arrangement of FIG. 4 at positions A-C respectively. The deflections are measured in mm at the lower part of the carrier element 4 as a function of conveyor speed, which is measured in numbers of conveyed objects pr. hour. Each figure shows 6 sets of measurements: Three sets of measurements 501 with the guide bar in place and at three different speeds, and three sets of measurements 502 without the guide bar in place and at the same three speeds. Each set of measurements shows a minimum deflection (lower curves), and average deflection (centre curve), and a maximum deflection (upper curve).

FIG. 5 shows measured deflections at position A, FIG. 6 shows measured deflections at position B, and FIG. 7 shows measured deflections at position C.

From the figures it can be seen that the deflections with the guide bar in place are larger, which is understandable as the guide bar forces the objects to be deflected at the entry to the curved portion.

At position B, the deflections with and without guide bar are comparable, while at position C, i.e. at the transition back to the straight downstream portions, the deflections with guide bar are considerably more uniform and independent of the speed of conveyance, thereby reducing unwanted uncontrolled oscillations.

Figure 8A:
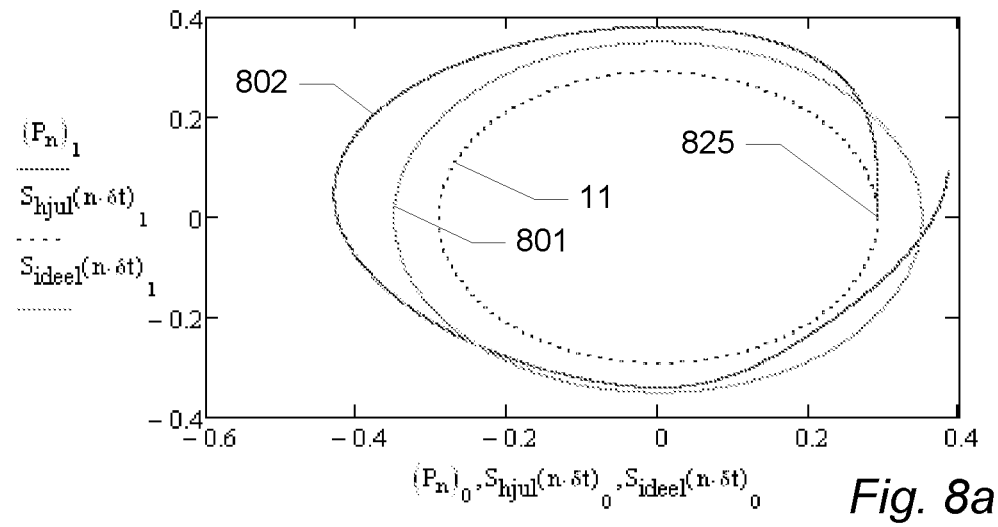
FIG. 8 show simulated trajectories of a suspended object in a curved portion of a conveyor apparatus.
Figure 8B:
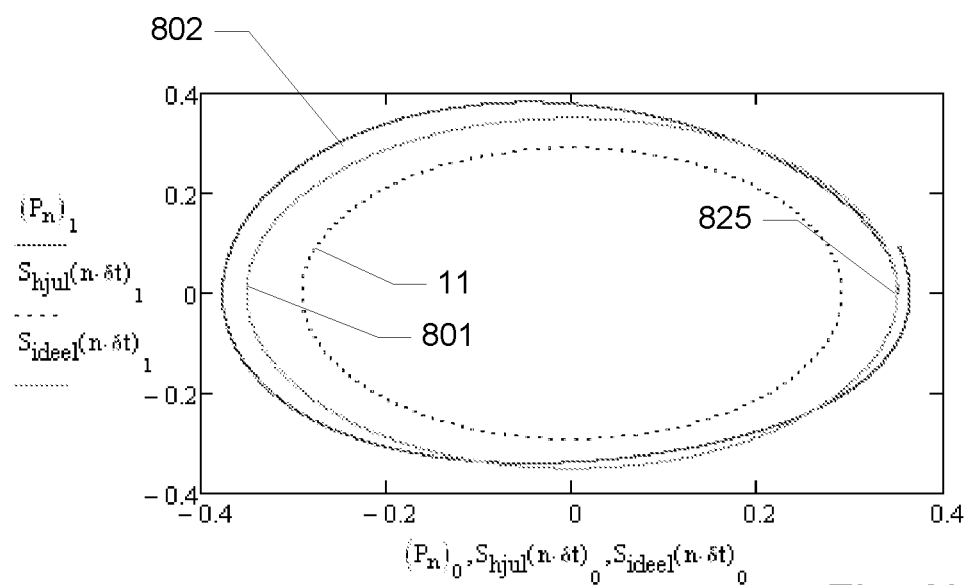

FIG. 8 show simulated trajectories of a suspended object in a curved portion of a conveyor apparatus. Curve 11 corresponds to the path of the suspension point, curve 801 corresponds to the desired ideal (steady state) trajectory of the centre of mass of the suspended object, while curve 802 shows the simulated trajectory of the centre of mass of the suspended object. FIG. 8a shows the trajectories without a guide bar, i.e. where the centre of mass enters the curved section at position 825 vertically aligned with the trajectory 11 of the suspension point. FIG. 8b shows the trajectories with a guide bar arranged such that the centre of mass enters the curved section at position 825 deflected by a deflection corresponding to the desired path. A comparison of FIGS. 8a and 8b show that the trajectory with the guide bar (FIG. 8b) is considerably more even and shows a lesser degree of radial oscillation.

FIGS. 9-13 show further examples of a conveyor apparatus. In particular, FIGS. 9-13 show examples of a conveyor apparatus similar to the one shown in FIG. 1. Consequently, the features and components of the conveyor apparatus will not be described in detail again here. Furthermore, for the sake of simplicity of the drawing, the carriages and suspended objects are not explicitly shown in FIGS. 9-11.

Figure 9:
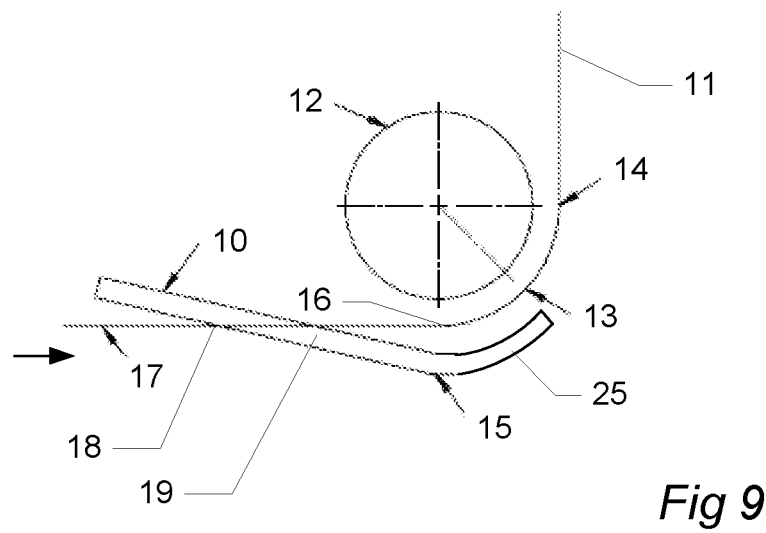
FIGS. 9-13 show further examples of a conveyor apparatus.

FIG. 9 shows an example of a conveyor apparatus where the guide bar 10 has an overrun portion 25 that extends through a part of the curved portion. The overrun portion 25 is curved so as to follow the curved portion of the rail at a constant horizontal distance from the rail 11. In some embodiments, the guide may extend through the entire curve and then gradually return to a position in vertical alignment with the suspension point.

Figure 10:
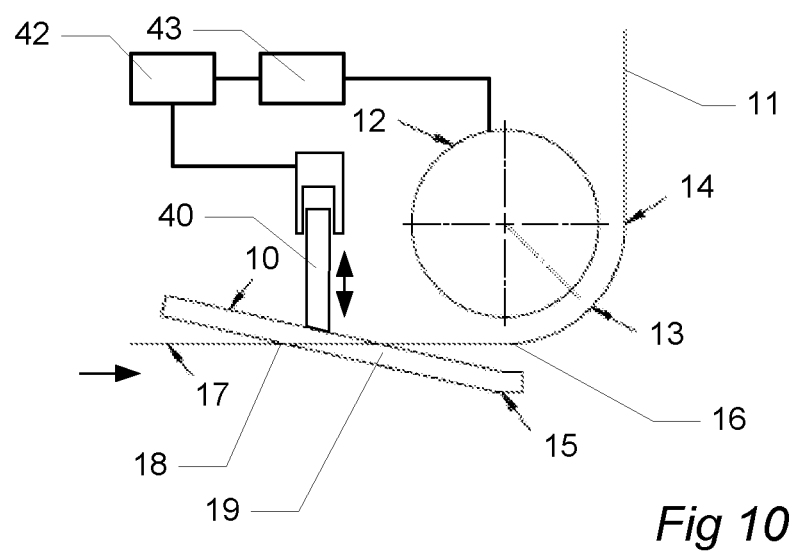

FIG. 10 shows an example of a conveyor apparatus where the guide bar 10 is horizontally displaceable in a direction transverse relative to the rail 11, so as to vary the deflection of the suspended objects at the transition point 16. In the example of FIG. 10, the guide bar is mounted to a piston 40, e.g. a pneumatic piston that can be controlled to provide a horizontal, transverse displacement of the guide bar. The piston is controlled by a control unit 42 that may control the speed of conveyance of the conveyor apparatus, e.g. by controlling a motor 43 that drives the wheel 12. The control unit 42 is configured to control the piston 40 to displace the guide bar 10 responsive to the speed at which the conveyor apparatus is operated.

It will be appreciated that the displacement of the guide bar may be provided by any other suitable means, e.g. a linear motor or other form of actuator. Similarly, it may be appreciated that the control unit may be any suitable control unit for controlling a conveyor apparatus or a part thereof, e.g. an electronic control unit, a PLC unit, a computer-based control unit, and/or the like. It will further be appreciated that in an alternative embodiment the control unit may be separate from the speed control system of the conveyor apparatus. For example, the control unit may determine the speed of the conveyor apparatus by means of a suitable sensor, e.g. an optical sensor, and control the displacement of the guide bar responsive to the measured speed.

Figure 11:
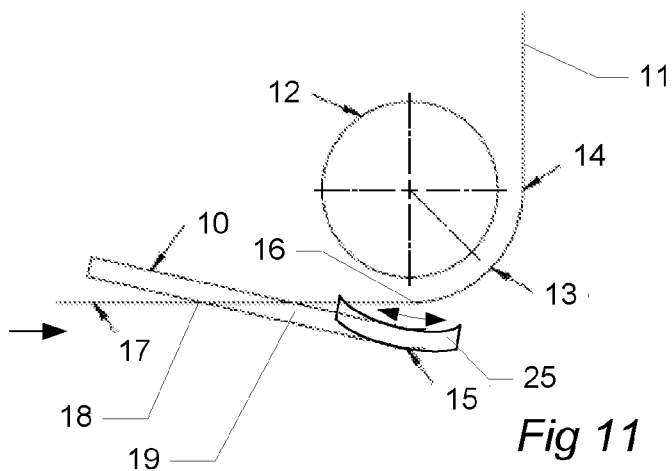

FIG. 11 shows an example of a conveyor apparatus where the guide bar 10 comprises an overrun portion whose length is adjustable, e.g. responsive to the speed of the conveyor apparatus. For example, this may be achieved by a control unit similar to the control unit shown in FIG. 10. For example, the overrun portion of the guiding bar may be arranged movably relative to the straight portion 19 of the guide. For example, the guide bar 10 may be formed by two separate bodies, such that the first body can be slid in and out of the second body, e.g. by means of a piston, an actuator, and/or the like.

Figure 12:
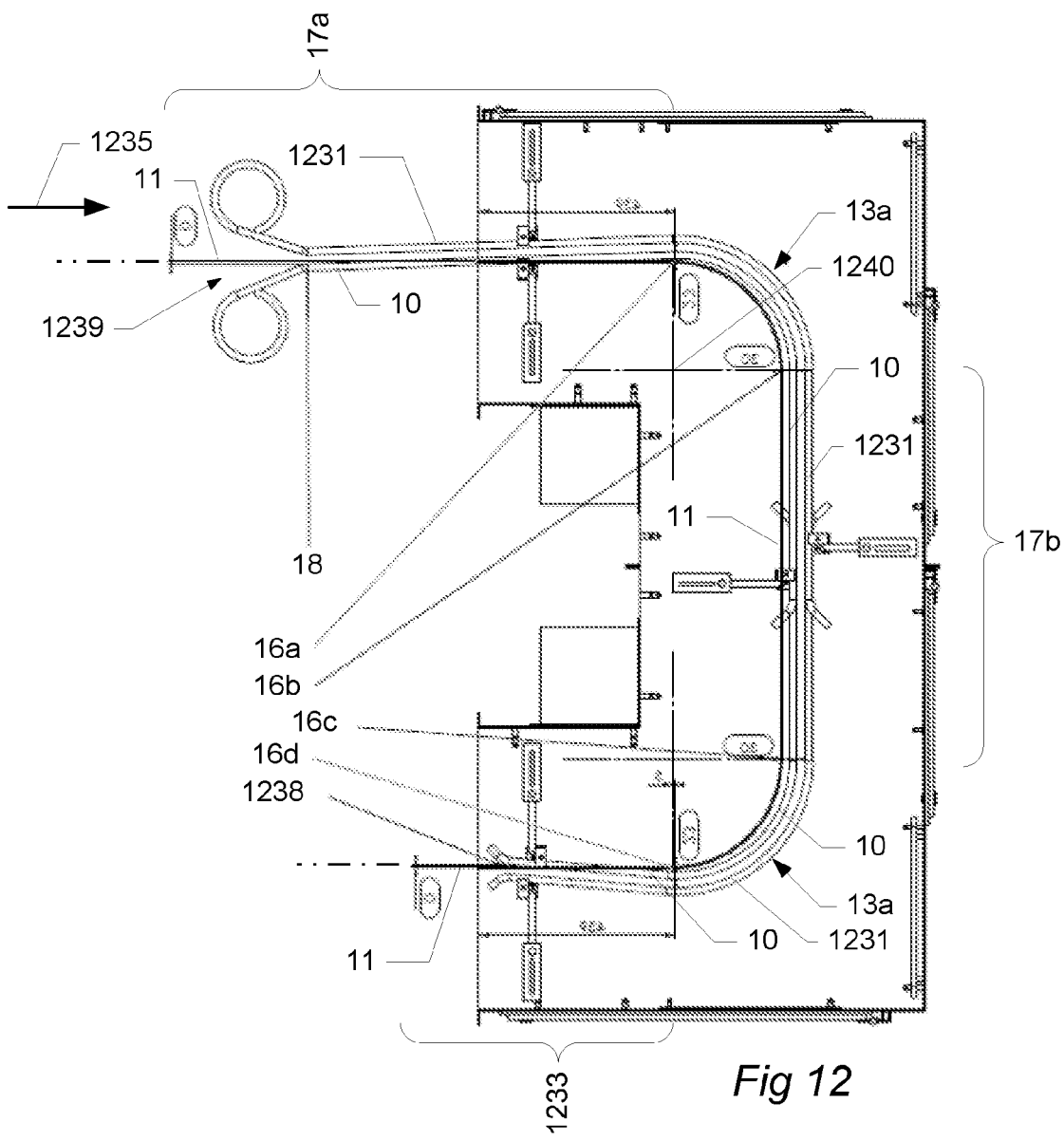

FIG. 12 shows yet another example of a part of a conveyor apparatus. The conveyor apparatus comprises a rail 11 defining the path of conveyance. The path comprises a first straight upstream portion 17a, a first curved portion 13a downstream of the upstream portion 17a and extending from transition point 16a to transition point 16b, a second straight portion 17b downstream of the first curved portion 13a and extending from transition point 16b to transition point 16c, a second curved portion 13b downstream of the second straight portion 17b and extending from transition point 16c to transition point 16d, and a straight downstream portion 1233 downstream of the second curved portion 13b and extending from transition point 16d onwards. The apparatus further comprises an inner guide rail 10 and an outer guide rail 1231. The guide rails 10 and 1231 are arranged along rail 11 and parallel to each other at a lateral distance from each other so as to allow a suspension device suspended from the rail 11 to travel between guide rails 10 and 1231. The guide rails 10 and 1231 extend from an intersection position 18 on the upstream portion 17a throughout a position 1238 on the downstream portion 1233. Upstream of the intersection position 18, the guide rails are curved laterally away from each other so as to form a V-shaped entry region 1239 where a carrier device (not shown) suspended from the rail 11 and travelling in the direction indicated by arrow 1235 is caught between the guide rails. When the carrier device continues along the rail 11, the inner guide rail 10 gradually deflects the carrier device in a lateral outward direction as defined by the curvature of the first curved portion 13a, i.e. laterally away from the centre 1240 of the first curved portion. In the embodiment of FIG. 12, the inner guide rail 10 extends beyond the transition point 16a where the straight portion 17a stops and the first curved portion 13a starts. Furthermore, the inner guide rail 10 is arranged such that its horizontal distance to the rail 11 increases throughout at least a portion of the curved portion 13a. This further increase in deflection results in a particular effective suppression of lateral oscillations, as the suspended object is accelerated in the longitudinal direction along the path during the curved portion, because the path of the deflected object is longer than the path of the corresponding suspension point along rail 11.

It will be appreciated that the motion of the suspended object may be determined by solving (e.g. numerically) the corresponding equations of motions:

$$a_c(\beta) = -g \tan(\beta)$$

$$a_t(\alpha) = -g \sin(\alpha)\cos(\alpha)$$

$$a_z(\alpha) = -g \sin^2(\alpha)$$

with the initial velocity vector $(0, v, 0)^T$. The deflection throughout the first curved portion may thus be increased so as to correspond to the solution of the above equations.

Furthermore, in this embodiment, the inner guide rail continues parallel with the second straight portion 17b and follows the path through the second curved portion 13b and through a portion of the subsequent downstream portion 17b. Throughout the second curved portion 13b and the downstream portion, the inner and outer guide rails 11 and 1231 are arranged such that their respective horizontal distance from the rail 11 gradually decreases, such that the deflection of the suspended object is gradually decreased when it travels along the second curved portion and the downstream portion until the deflection is reduced to zero at the end point 1238 where the object again travels suspended directly under the rail 11. It may be noted that the longitudinal speed of the object is gradually decreased along the downstream portion 17b due to friction between the carrier device and the guide rails 10 and 1231 until the longitudinal speed of the object again corresponds to the speed of conveyance at which the suspension point travels along rail 11.

Figure 13:
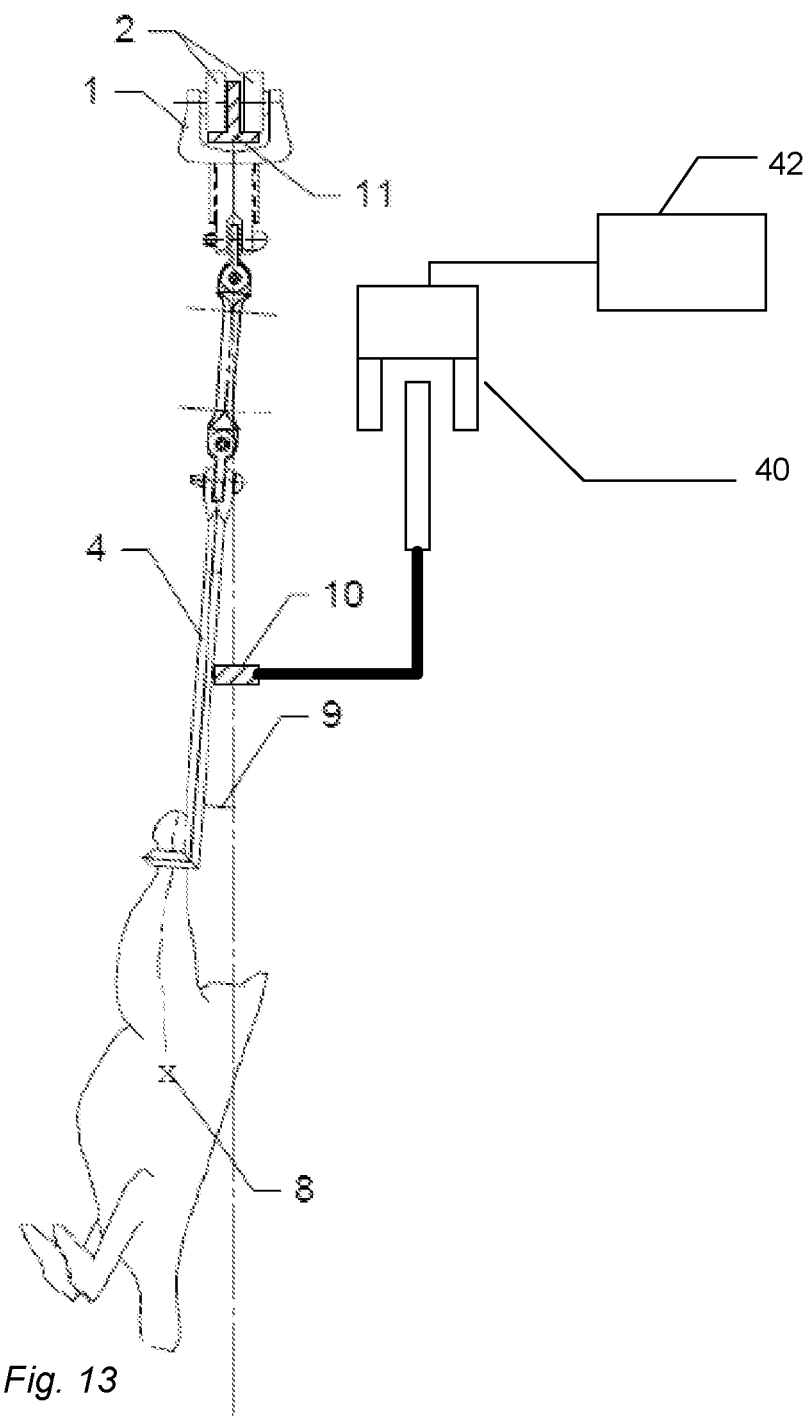

FIG. 13 shows an example of a conveyor apparatus where the guide bar 10 is vertical displaceable in a direction parallel relative to the carrier element 4 when the suspended object 8 is passive with no resulting forces other than gravity. The deflection of the suspended objects at the transition point 16 is then controlled by varying the point of contact along the carrier element 4. In the example of FIG. 13, the guide bar is mounted to a piston 40, e.g. a pneumatic piston that can be controlled to provide a vertical displacement of the guide bar in which way the deflection angel will vary. The control unit 42 is configured to control the piston 40 to displace the guide bar 10 responsive to the speed at which the conveyor apparatus is operated. To this end, the control unit may receive a control signal, e.g. from a motor (not explicitly shown) driving the conveyor apparatus, indicative of the speed at which the conveyor apparatus is operated. Alternatively, control unit 42 may control the motor driving the conveyor apparatus.

Hence, in the above embodiments, a food item or other object may be introduced at a carousel of the conveyor apparatus at a suitable offset before entering the carousel. For example, the conveyor apparatus may comprise a processing machine that processes or otherwise manipulates the suspended objects in the carousel. This offset reduces the variation of the swinging movement significantly. When the food item is introduced at the carousel at an angle to the vertical with a distance to the center equal to the distance that the food item would have in a steady state rotation, the reduction of oscillations is particularly efficient. The offset distance may be determined taking into consideration the velocity of the transported food item.

Although some embodiments have been described and shown in detail, the invention is not restricted to them, but may also be embodied in other ways within the scope of the subject matter defined in the following claims. In particular, even though embodiments of the conveyor apparatus have primarily been described with reference to the transportation of carcasses, it will be appreciated that the conveyor apparatus described herein may be used in a large variety of overhead conveyor systems, such as in the food, steel, and/or car industries etc. Similarly, even though embodiments of the conveyor apparatus have primarily been described with reference to circularly curved portions and straight upstream portions, it will be appreciated that apparatus and method described herein may also be applied to curved portions that are not circular, and upstream portions that are not straight.

In the device and/or apparatus claims enumerating several means, several of these means can be embodied by one and the same object of hardware or structural element. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A conveyor apparatus for conveying objects along a path, the path including a curved portion and an upstream portion, upstream of the curved portion, the upstream portion defining a direction of entry into the curved portion, the curved portion defining a radially outward direction transverse to the direction of entry into the curved portion; the conveyor apparatus comprising:
    a suspension member adapted to travel along the path and to carry an object to be conveyed suspended at the suspension member; and
    a deflection member arranged to deflect an object suspended at the suspension member in the radially outward direction when the suspension member travels along the upstream portion towards the curved portion,
    wherein the deflection member comprises an elongated guide member, and the elongated guide member comprises a portion parallel to the path and separated from the path.

2. A conveyor apparatus according to claim 1, comprising a track defining the path, and wherein the suspension member comprises a carrier arranged to move along the track.

3. A conveyor apparatus according to claim 1, wherein the elongated guide member includes an overrun portion extending beyond the upstream portion into the curved portion.

4. A conveyor apparatus according to claim 3, comprising a control unit for controlling a length of the overrun portion responsive to a speed of conveyance of the conveyor apparatus.

5. A conveyor apparatus according to claim 1, wherein the suspension member defines a suspension point of the suspended object, and wherein the path defines a trajectory of the suspension point.

6. A conveyor apparatus according to claim 5, wherein the deflection member is configured to deflect the object radially outward from a vertical direction defined by the suspension point.

7. A conveyor apparatus according to claim 1, wherein the deflection member is configured to deflect the object by a magnitude of deflection that increases with decreasing distance of the object from an entry into the curved portion.

8. Use of the conveyor apparatus according to claim 1 for conveying suspended carcasses.

9. A conveyor apparatus for conveying objects along a path, the path including a curved portion and an upstream portion, upstream of the curved portion, the upstream portion defining a direction of entry into the curved portion, the curved portion defining a radially outward direction transverse to the direction of entry into the curved portion; the conveyor apparatus comprising:
    a suspension member adapted to travel along the path and to carry an object to be conveyed suspended at the suspension member;
    a deflection member arranged to deflect an object suspended at the suspension member in the radially outward direction when the suspension member travels along the upstream portion towards the curved portion; and
    a control unit for adjusting a magnitude of deflection responsive to a speed of conveyance of the conveyor apparatus.

10. A conveyor apparatus for conveying objects along a path, the path including a curved portion and an upstream portion, upstream of the curved portion, the upstream portion defining a direction of entry into the curved portion, the curved portion defining a radially outward direction transverse to the direction of entry into the curved portion; the conveyor apparatus comprising:

a suspension member adapted to travel along the path and to carry an object to be conveyed suspended at the suspension member; and a deflection member arranged to deflect an object suspended at the suspension member in the radially outward direction when the suspension member travels along the upstream portion towards the curved portion, wherein the conveyor apparatus is arranged to operate at a speed of conveyance, and wherein the deflection member is configured to deflect the object by a magnitude of deflection corresponding to a steady-state deflection during movement of the suspended objects through the curved portion at the speed of conveyance.

11. A conveyor apparatus for conveying objects along a path, the path including a curved portion and an upstream portion, upstream of the curved portion, the upstream portion defining a direction of entry into the curved portion, the curved portion defining a radially outward direction transverse to the direction of entry into the curved portion; the conveyor apparatus comprising:

a suspension member adapted to travel along the path and to carry an object to be conveyed suspended at the suspension member; and a deflection member arranged to deflect an object suspended at the suspension member in the radially outward direction when the suspension member travels along the upstream portion towards the curved portion, wherein the path further comprises a downstream portion, downstream of the curved portion, and wherein the deflection member is further arranged to deflect the object in the radially outward direction when the suspension member travels along the curved portion and to gradually decrease the deflection downstream of the curved portion when the suspension member travels along the downstream portion.

12. A method of controlling a conveyor apparatus for conveying objects along a path, the path including an upstream portion and a curved portion, the upstream portion defining a direction of entry into the curved portion, the curved portion defining a radially outward direction transverse to the direction of entry into the curved portion; the conveyor apparatus comprising a suspension member adapted to travel along the path and to carry an object to be conveyed suspended at the suspension member; a deflection member arranged to deflect an object suspended at the suspension member in the radially outward direction when the suspension member travels along the upstream portion towards the curved portion, the method comprising:

determining a speed of conveyance at which the suspension member travel along the path;

controlling a magnitude of deflection caused by the deflection member responsive to the determined speed.

* * * * *